UNITED STATES PATENT OFFICE 2,574,480

HYDROFLUORINATION OF ACETYLENIC HYDROCARBONS

John C. Hillyer and Joseph F. Wilson, Bartlesville, Okla., assignors to Phillips Petroleum Company, a corporation of Delaware No Drawing. Application November 26, 1948, Serial No. 62,244

6 Claims. (Cl. 260—653)

This invention relates to a method for the hydrofluorination of acetylenic hydrocarbons. In one of its aspects this invention relates to a process for the interaction of acetylenic hydrocarbons with hydrogen fluoride in the presence of novel catalysts for the reaction. This invention is useful for the production of unsaturated monofluoride and saturated difluoride hydrocarbon derivatives.

The direct interaction of acetylenic hydrocarbons with hydrogen halides to produce the corresponding unsaturated monohalides and/or dihaloalkanes has long been known in the art. However, this method of procedure, particularly when applied to the hydrofluorination of acetylenic hydrocarbons, is too inefficient, in reaction rate and yield of product to have commercial significance. Catalysts such as mercuric oxide or the mercuric halides have been employed to activate the interaction of acetylene with hydrogen halides, particularly hydrogen chloride. Attempts to operate in this manner in the hydrofluorination of acetylenic hydrocarbons have met with numerous difficulties such as long induction periods, poor yields, reduction of the catalyst by the hydrocarbon, etc. In our copending application, Serial No. 792,832, filed December 19, 1947, now U. S. Patent 2,471,525 issued May 31, 1949, of which this application is a continuation-in-part, a process for the hydrofluorination of acetylenic hydrocarbons using catalysts comprising the oxide or trifluoride of aluminum is described whereby improvements over processes previously disclosed are realized.

It is an object of this invention to provide novel catalysts for the interaction of hydrogen fluoride and acetylenic hydrocarbons.

It is another object of this invention to provide a novel catalytic process for the hydrofluorination of acetylenic hydrocarbons.

It is a further object of this invention to react acetylenic hydrocarbons and hydrogen fluoride with the consequent elimination of difficulties of the prior art.

A further object of this invention is to provide a novel catalytic process for the production of saturated and unsaturated fluorinated hydrocarbons.

Other inherent objects of this invention will be apparent from our disclosure hereinbelow.

We have found that difficulties encountered in the prior art can be overcome by interacting acetylenic hydrocarbons and hydrogen fluoride in the presence of novel catalysts for the reaction. The acetylenic hydrocarbons that we prefer to use to carry out our invention are those hydrocarbons having an acetylenic carbon-to-carbon linkage or triple bond. Typical examples are acetylene, methyl acetylene, ethyl acetylene, dimethyl acetylene, etc. Although less preferable, we can use those acetylenic hydrocarbons containing an acetylenic triple bond and an olefinic double bond within the hydrocarbon molecule. An example of this less preferred type is hexene-5-yne-1. We prefer to use acetylenic hydrocarbons having no more than 10 carbon atoms per molecule, however, this is merely a preference and not a critical limitation. The acetylenic hydrocarbons are reacted with hydrogen fluoride in such a manner that one or two molecules of hydrogen fluoride add to the unsaturated carbon atoms of one molecule of the acetylenic hydrocarbon, and, as a consequence, the products of this addition reaction comprise essentially unsaturated monofluorides having an olefinic carbon-to-carbon linkage wherein the fluoride radical is attached to one of the unsaturated carbon atoms and gem-difluoroalkanes which are saturated hydrocarbons containing two fluoride radicals or substituent groups attached to one of the carbon atoms in the molecule. These products of the addition reaction will contain carbon atoms corresponding in number to the acetylenic hydrocarbons. In a specific aspect acetylene is reacted with hydrogen fluoride to produce vinyl fluoride and 1,1-difluoroethane.

The catalysts that we use to carry out our process are of the solid type and are compositions of alumina with a fluoride of a metal selected from the group consisting of aluminum, antimony, zinc, cadmium and cobalt. While the alumina, which usually makes up a major proportion, generally from 70 to 95 weight per cent, of our catalyst compositions has definite catalytic properties for the reaction between acetylenic hydrocarbons and hydrogen fluoride, these catalytic properties are greatly enhanced by the minor proportion of the specified metallic fluorides incorporated therewith. For example, when alumina is used alone, a per pass conversion of acetylenic hydrocarbon of from 70 to 80 per cent is realized. However, by incorporation of about 15 per cent of one of our metallic fluorides with the alumina the per pass conversion is increased by as much as 25 per cent or more.

The alumina that we use is preferably a commercially prepared aluminum oxide, but we have also used, less preferably, naturally-occurring bauxite, having a low silica content. Also, in our reaction we have used activated alumina which is a highly porous, granular form of aluminum oxide. The cobalt fluoride that we use is preferably in the cobaltous or difluoride form, and the antimony fluoride is preferably in the trifluoride form.

The catalysts for our process are prepared from alumina, which may be either natural or synthetic, impregnated with what is usually a minor amount, such as from 5 to 30 weight per cent, preferably from 10 to 20 weight per cent, of one of the above-named metallic fluorides. The incorporation of the metallic fluoride in the alumina may be effected in any convenient manner. For example, with those metallic fluorides that are soluble in water alumina pills or pellets may be dipped into a substantially saturated solution of the metallic fluoride after which the dipped pellets are dried, or in another method of preparation alumina pills or pellets may be finely ground along with the metallic fluoride and, after the addition of a suitable binder, such as a hydrogenated corn oil, graphite, etc., the finely ground catalyst is pelleted. We prefer to use our catalysts in the form of granules or pellets. The catalysts may be employed as a fixed bed of coarse granules, as a bed of finely divided particles in ebullient motion in a stream of upward flowing reactants, or as a stream of finely divided particles passing through a reaction zone.

In the practice of our invention we have found that the best results are obtained when molar ratios of acetylenic hydrocarbon and hydrogen fluoride within the range of 1:1 to 1:4 are used, but other ratios may be used without departing from the scope of our invention. We also prefer to contact the reactants with the catalyst at such a rate that a contact time of from 1 to 15 seconds is obtained. We further prefer to use reaction temperatures of from 350 to 750° F., preferably from 450° to 650° F., and pressures which are substantially atmospheric, however, we do not intend to exclude conditions outside these ranges. For example, pressures as high as 50 p. s. i. g. and higher may be used to carry out our process. If desired, the reaction may be effected in the presence of a diluent which is inert under the reaction conditions. Suitable diluents are nitrogen, methane, carbon tetrafluoride, etc. Under our preferred conditions the reaction is initiated promptly and proceeds at an increasing rate until maximum conversions as high as 95 per cent or more are realized in from one to two hours after a specific catalyst has been put on stream. Cracking of the hydrocarbons and carbon deposition occur to such a minor degree that shutdowns for catalyst regeneration are necessary only after long periods of operation.

The effluent from our process contains unconverted reactants in addition to the reaction products which are the unsaturated monofluoride and the gem-difluoroalkane derivatives of the acetylenic hydrocarbon employed in the process in substantially a mol-for-mol ratio. The unreacted hydrogen fluoride may be separated from the effluent by any suitable means, such as by passage over sodium fluoride, and the unconverted acetylenic hydrocarbon may be removed from the reaction products in a condenser maintained at a temperature such that condensation of the reaction products occurs without solidification of the acetylenic hydrocarbon. The liquid effluent may then be removed to a fractionating system where dissolved acetylenic hydrocarbon is removed overhead. If desired, in this fractionating system the unsaturated monofluorides may be separated from the gem-difluoroalkanes. The monofluorides may be used as comonomers in the production of resins of the type known as "vinyl" resins, and the gem-difluoroalkanes may be used as refrigerants, propellants for insecticides of the "aerosol" type, etc. Alternatively, if it is desired to produce the unsaturated monofluorides as the principal reaction product, the gem-difluoroalkanes may be admixed with additional quantities of acetylenic hydrocarbon and returned to the reaction zone. Operational details for the method of operation are described in our copending application Serial No. 61,948 filed November 26, 1948.

The practice of our invention is exemplified by the non-limiting specific examples hereinbelow.

*Example 1*

Two steel catalyst tubes were charged with pelleted alumina catalysts, that in the first tube being impregnated with fifteen per cent zinc fluoride. The second was maintained as a control. A third tube, was charged with a catalyst comprising zinc fluoride deposited on a graphite support. To each of these reactors was fed a stream of mixed acetylene and hydrogen fluoride. The temperature in the catalyst zones was maintained at 600° F. The effluent from each reactor was passed over sodium fluoride to remove unreacted hydrogen fluoride after which it was condensed in a refrigerated condenser maintained at a temperature of −108.5° F. The liquid condensate was fractionated to remove dissolved acetylene and separate vinyl fluoride and 1,1-difluoroethane.

Data on operating conditions and conversions are tabulated below.

| Catalyst | Mol Ratio $C_2H_2$:HF | Acetylene (gms.) | | Contact Time (Sec.) | Per Cent Conversion of Acetylene |
|---|---|---|---|---|---|
| | | Charged | Recovered | | |
| $Al_2O_3$–$ZnF_2$ | 1:1.9 | 130.0 | 10.0 | 4.0 | 92.4 |
| $Al_2O_3$ | 1:1.1 | 162.5 | 35.2 | 8.9 | 77.8 |
| $ZnF_2$ | 1:2.8 | 119.7 | 118.8 | 4.6 | 00.0 |

In the runs using the $Al_2O_3$–$ZnF_2$ and $Al_2O_3$ catalysts the reactions were initiated promptly, liquid product appearing in the condenser as soon as the catalyst case was swept clear of residual inert gases. Fractionation of the effluent from each reactor gave approximately equal amounts by volume of vinyl fluoride (B. P. −97 to −99° F.) and 1,1-difluoroethane (B. P. −11 to −13° F.).

*Example 2*

Two steel reactor tubes were set up as in Example 1. The first was charged with a catalyst comprising 14 per cent zinc fluoride, 82 per cent alumina, and 4 per cent binder. The second was charged with an alumina catalyst equal in amount to that of the catalyst composition in the first reaction. A mixture of hydrogen fluoride and acetylene was fed to each reactor, the temperature levels being maintained at about 500° F. The products were collected as described in the preceding example. Data on these runs are tabulated below.

| Catalyst | Mol Ratio, $C_2H_2$:HF | Contact Time (Sec.) | Duration Run (Hrs.) | Liquid Products (in cc.) |
|---|---|---|---|---|
| $Al_2O_3$–$ZnF_2$ | 1:3.40 | 3.0 | 8.5 | 31.0 |
| $Al_2O_3$ | 1:1.99 | 2.9 | 8.5 | 15.8 |

Example 3

Two runs were made using the same catalysts as described in Example 2 and procedure similar to that of the preceding operations except that temperatures and ratios of reactants were changed. Data on these runs are shown in the following tabulation:

| Catalyst | Temp. (° F.) | Mol Ratio ($C_2H_2$:HF) | Contact Time (Sec.) | Duration Run (Hrs.) | Liquid Products (in cc) |
|---|---|---|---|---|---|
| $Al_2O_3$-$ZnF_2$ | 450 | 1:2.10 | 3.5 | 7.0 | 26.4 |
| $Al_2O_3$ | 500 | 1:2.79 | 2.7 | 7.0 | 3.8 |

Example 4

Two additional runs were made in the manner described in Example 3. Data on these runs are shown below:

| Catalyst | Temp. (° F.) | Mol Ratio ($C_2H_2$:HF) | Contact Time (Sec.) | Duration Run (Hrs.) | Liquid Products (in cc.) |
|---|---|---|---|---|---|
| $Al_2O_3$-$ZnF_2$ | 450 | 1:2.08 | 3.2 | 8.0 | 33.4 |
| $Al_2O_3$ | 500 | 1:1.64 | 3.5 | 8.0 | 17.6 |

Example 5

Aluminum fluoride was ground and pelleted with alumina to produce a catalyst containing 19.9 per cent $AlF_3$, 70.1 per cent $Al_2O_3$ and 10.0 per cent binder. Using the resulting catalyst in a manner similar to that described in the above example the following data were obtained:

| Temp. (° F.) | Mol Ratio ($C_2H_2$:HF) | Contact Time (Sec.) | Duration Run (Hrs.) | Liquid Products (in cc.) |
|---|---|---|---|---|
| 500 | 1:4.0 | 1.1 | 7.0 | 43.6 |
| 500 | 1:2.25 | 1.6 | 8.0 | 45.7 |

Distillation of the liquid product gave equal amounts of vinyl fluoride and 1,1-difluoroethane.

From the above examples and disclosure numerous variations and embodiments of our invention will be apparent to one skilled in the art without going beyond the scope of our invention.

We claim:

1. The process which comprises reacting an acetylenic hydrocarbon with hydrogen fluoride, employed in a molar ratio of acetylenic hydrocarbon to hydrogen fluoride within the range of 1:1 to 1:4, at a temperature within the range of 350 to 750° F. and in the presence of a catalyst comprising from 70 to 95 weight per cent alumina and from 5 to 30 weight per cent $ZnF_2$, and recovering hydrofluorinated products thus produced.

2. A process according to claim 1 wherein the acetylenic hydrocarbon contains no more than 10 carbon atoms per molecule.

3. A process according to claim 1 wherein the acetylenic hydrocarbon is acetylene.

4. The process which comprises reacting an acetylenic hydrocarbon containing no more than 10 carbon atoms per molecule with hydrogen fluoride employed in a molar ratio of acetylenic hydrocarbon to hydrogen fluoride within the range of 1:1 to 1:4 in the presence of a catalyst containing from 70 to 95 weight per cent alumina and from 5 to 30 weight per cent of $ZnF_2$ at a temperature within the range of 350 to 750° F. and at a contact time of from 1 to 15 seconds, and recovering an unsaturated monofluoride thus produced.

5. A process according to claim 4 wherein atmospheric pressure is employed.

6. The process which comprises reacting acetylene with an equimolar proportion of hydrogen fluoride in the presence of a catalyst consisting essentially of from 80 to 90 weight per cent alumina impregnated with from 10 to 20 weight per cent of $ZnF_2$ at a temperature of from 450 to 650° F. and recovering the thus-produced vinyl fluoride and 1,1-difluorethane.

JOHN C. HILLYER.
JOSEPH F. WILSON.

REFERENCES CITED

The following references are of record in the file of this patent:

UNITED STATES PATENTS

| Number | Name | Date |
|---|---|---|
| 1,950,431 | Carothers et al. | May 13, 1934 |
| 1,996,115 | Lazier | Apr. 2, 1935 |
| 2,118,901 | Soll | May 31, 1938 |
| 2,407,701 | Jones et al. | Sept. 17, 1946 |
| 2,471,525 | Hillyer et al. | May 31, 1949 |